US006980710B2

(12) United States Patent
Farahi et al.

(10) Patent No.: US 6,980,710 B2
(45) Date of Patent: Dec. 27, 2005

(54) PROCESS FOR EFFICIENT LIGHT EXTRACTION FROM LIGHT EMITTING CHIPS

(75) Inventors: Faramarz Farahi, Charlotte, NC (US); Patrick Moyer, Charlotte, NC (US); Ramazan Benrashid, Concord, NC (US); Leilabady Pedram, Charlotte, NC (US)

(73) Assignee: Waveguide Solutions Inc, Charlotte, NC (US)

( * ) Notice: Subject to any disclaimer, the term of this patent is extended or adjusted under 35 U.S.C. 154(b) by 362 days.

(21) Appl. No.: 10/339,815

(22) Filed: Jan. 10, 2003

(65) Prior Publication Data

US 2003/0124754 A1 Jul. 3, 2003

Related U.S. Application Data

(63) Continuation-in-part of application No. 09/803,342, filed on Mar. 9, 2001.

(51) Int. Cl.$^7$ ............................. G02B 6/00; G02B 6/14
(52) U.S. Cl. ...................... 385/14; 385/129; 257/99; 427/164

(58) Field of Search ................................ 313/503, 504; 257/40, 59, 72, 99, 76, 77, 22; 438/22, 46, 438/47; 427/573, 579, 574, 563, 164; 429/11; 29/11; 385/14, 129, 147

(56) References Cited

U.S. PATENT DOCUMENTS

| 5,480,687 A * | 1/1996 | Heming et al. ............. 427/573 |
| 5,726,462 A * | 3/1998 | Spahn et al. .................. 257/76 |
| 6,150,668 A * | 11/2000 | Bao et al. ..................... 257/40 |
| 6,258,618 B1 * | 7/2001 | Lester ......................... 438/46 |

* cited by examiner

Primary Examiner—Akm Enayet Ulah
(74) Attorney, Agent, or Firm—Andrew F. Sayko, Jr.

(57) ABSTRACT

The present invention claims a unique way to pattern an optical microstructure immediately on top of a mass produced light-emitting device, such as a light emitting diode (LED), a vertical cavity surface emitting laser (VCSEL) or a photo detector, for the purpose of efficient coupling of light to or from the active region of the light-emitting device. The invention addresses the need to effectively and efficiently extract light from the light-emitting optoelectronic device. Finally, the invention allows for the optical microstructure to be deposited and patterned directly over the light-emitting device contained on a suitable substrate, such as a wafer.

10 Claims, 12 Drawing Sheets

18

Waveguide Solutions Proprietary

PROCESS FOR EFFICIENT LIGHT EXTRACTION FROM LIGHT EMITTING CHIPS

This is a continuation-in-part of application Ser. No. 09/803,342, filed Mar. 9, 2001.

FIELD OF THE INVENTION

The present invention relates to light-emitting devices, such as light-emitting diodes and vertical cavity surface emitting lasers and, in particular, to the fabrication of such devices directly on a substrate, such as a wafer, that already contains the light-emitting device, in order to more efficiently extract light from the light-emitting device.

BACKGROUND OF THE INVENTION

Improving the efficiency of extracting light from a light-emitting device, such as a light-emitting diode (LED), primarily centers on two areas: (1) increasing the efficiency of the semiconductor material in generating light per unit of drive current (i.e. photons out per electrons in) and (2) improving the manner in which generated light is extracted from the light-emitting device. The present invention addresses the latter by providing a method for improving light extraction from a light-emitting device, such as an LED that is on a suitable substrate, such as a wafer used in the production of semiconductor devices. Light-emitting devices, such as an LED, suffer a large light loss because most of the light is guided through the active layer and lost out of the sides of the semiconductor material. Innovative designs in the chip or the packaging of the LED must then be employed to gather as much of the light as possible. Some of these collection mechanisms utilize parabolic cups in which the LED is packaged. Such designs are manufacturing-intensive and normally result in a low quality of the gathered optical light beam. The present invention allows for direct integration of the light extraction device into a standard semiconductor manufacturing process and does not involve the deposition of metal directly onto the structure. Thus, the subject invention is conducive to high volume and high yield manufacturing at significantly lower cost than previous processes for providing light extraction devices. The present invention also allows smaller packaging, which permits miniaturization of the final product and much more flexibility in the lighting applications for which such devices may be utilized.

Previous on-chip light extraction solutions include surface texturing (see U.S. Pat. No. 5,779,924), a thick epitaxial semiconductor layer (see U.S. Pat. No. 6,133,589), finely spaced reflective electrodes (see U.S. Pat. No. 6,258,618), and chip shaping (U.S. Pat. No. 6,323,063). These solutions are significantly different than the present invention in that they either attempt to extract the light more efficiently by distributing the current across the chip or they roughen the surface in order to increase the extraction efficiency. The subject invention comprises the fabrication of a micro-optical structure directly on the chip containing the light source, to direct a higher percentage of the light in a desired direction.

The claimed invention provides the following advantages over prior light extracting technologies: (1) it allows for efficient light collection and an optical light beam that is confined to an emission area slightly smaller than that of the LED chip, (2) the process can be directly integrated into a current semiconductor manufacturing process, and (3) it eliminates the need for any complicated packaging process, which usually requires the use of mirrored surfaces, cups or other packages. Another benefit of the subject invention is that it allows the addition of a microlens on top of the light emitting structure, once it is formed. The present invention preferably uses a gray-scale process to fabricate a mirrored surface, which is controllable, in order to form a simple flat mirror or a shaped surface to thereby provide a lensing effect to the mirror.

SUMMARY OF THE INVENTION

A method is provided for fabricating an optical microstructure comprising a spin-on-glass material (SOG) deposited over (on the top and/or bottom of) a light-emitting device, such as a light-emitting diode, vertical cavity surface emitting laser and/or photo detector, which is contained on a suitable substrate, such as a wafer used in the production of semiconductor devices. The claimed method comprises: 1) providing a light-emitting device on a suitable substrate, such as a wafer, 2) providing a vertically tapered microstructure (3-dimensionally shaped, e.g. a lens with curvature) over the light-emitting device on the substrate by fabricating a spin-on-glass material (SOG) vertically tapered microstructure directly onto the light-emitting device on the substrate, thereby providing efficient collection of the light that is coupled laterally out of the light-emitting device. The vertically tapered microstructure may be fabricated on top of a substrate or on the bottom of a substrate using a back-side alignment photolithography method. The vertically tapered SOG microstructure may optionally be coated with metal, so that the reflectivity increases the light extracted from the light-emitting device. The vertically tapered, 3-dimensional SOG microstructure can also be shaped to provide a lensing effect for efficient imaging and/or directing of the light. The SOG material deposited onto the wafer for the purpose of being shaped into a tapered microstructure may also contain a phosphorescent material, thereby enabling the generation of white light or other colors of light.

DETAILED DESCRIPTION OF THE INVENTION

All embodiments of the present invention utilize a hybrid glass/polymer sol-gel material, which is called a spin-on-glass material (SOG). The invention is not unique to a particular Sol-Gel, but it requires a Sol-Gel that can utilize a low process temperature (<225° C.), the ability to integrate into a traditional semiconductor process, and a level of integration that provides the advantages of the preferred embodiments of the present invention. An example of such a hybrid Sol-Gel material is described in a paper by Fardad et al. (M. Amir Fardad, Oleg V. Mishechkin, and Mahmoud Fallahi, "Hybrid Sol-Gel Materials for Integration of Optoelectronic Components", Journal of Lightwave Technology, Vol. 19, No. 1, January 2001). Details of the fabrication of the material and the process conditions can be found in this reference. Semiconductor LED's are frequently fabricated on a sapphire substrate by a number of major LED manufacturers. However, the claimed invention is not limited to this substrate material and is applicable to a number of substrates, which are well known to those skilled in the light-emitting device art. In fabricating a light-emitting device, such as an LED, the index of refraction of the LED material may be approximately 2.3, which is the case for gallium nitride (GaN) materials—the material of choice for most current LED devices. The index of refraction of the sapphire substrate is about 1.8. Thus, in such an LED device, the active LED region has a higher index of refraction than the substrate on which it is fabricated. Other LED's may not have the same characteristics because the index of refraction of some LED substrates (e.g., silicon carbide) is greater than that of the LED material. The LED device may then be put on a second suitable substrate, such as a wafer commonly used in the production of semiconductor devices, including computer chips.

The calculations shown below do not include Fresnel reflections at each surface or polarization dependencies. While these factors would somewhat affect the results, the following calculations clearly demonstrate the value of the present invention in improving light extraction efficiency from the light source contained on a chip.

Figure 1:
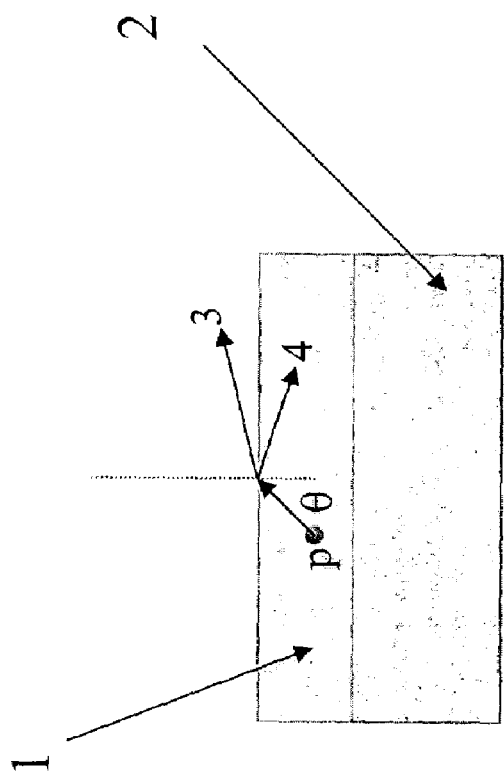
FIG. 1 demonstrates the path of some of the light rays in the first LED chip described above (GaN on a sapphire substrate). The semiconductor active region (1) of the LED and the substrate region (2) are shown in the diagram. The light originates in the active region (1). Some of the light rays (4) will totally internally reflect in the LED material and remain in the LED. Other light rays (3) will escape through the top of the LED material. For the case where the GaN chip is exposed directly to air (index of refraction=1.0), 4.98% of the light is emitted from the top surface. 62.2% of the light stays in the slab waveguide, which is defined as the GaN material that is deposited on top of the sapphire substrate. This results in side coupled light (6), which is shown in FIG. 2. The rest of the light, 32.8%, leaks into the substrate. Hence, theoretically, the claimed design will improve the light emission efficiency of each chip by more than a factor of 10.

The diagram of FIG. 1 shows the geometry of the calculations. For light emitted from point p, the direction of the light ray depends upon the index of refraction of each of the materials (described above), and the angle of the light ray. Only a small range of angles (0° to 25.8°) results in light that will be emitted from the surface, such as shown by light ray (3). For angles greater than 25.8°, the light is totally internally reflected (TIR) and is represented by light ray (4). Some of this light will then be lost through the substrate when it reaches that interface, but most of it continues to be guided in the slab defined by the GaN material. The present invention allows most of this light to be captured and coupled out through the top of the chip.

Figure 2:
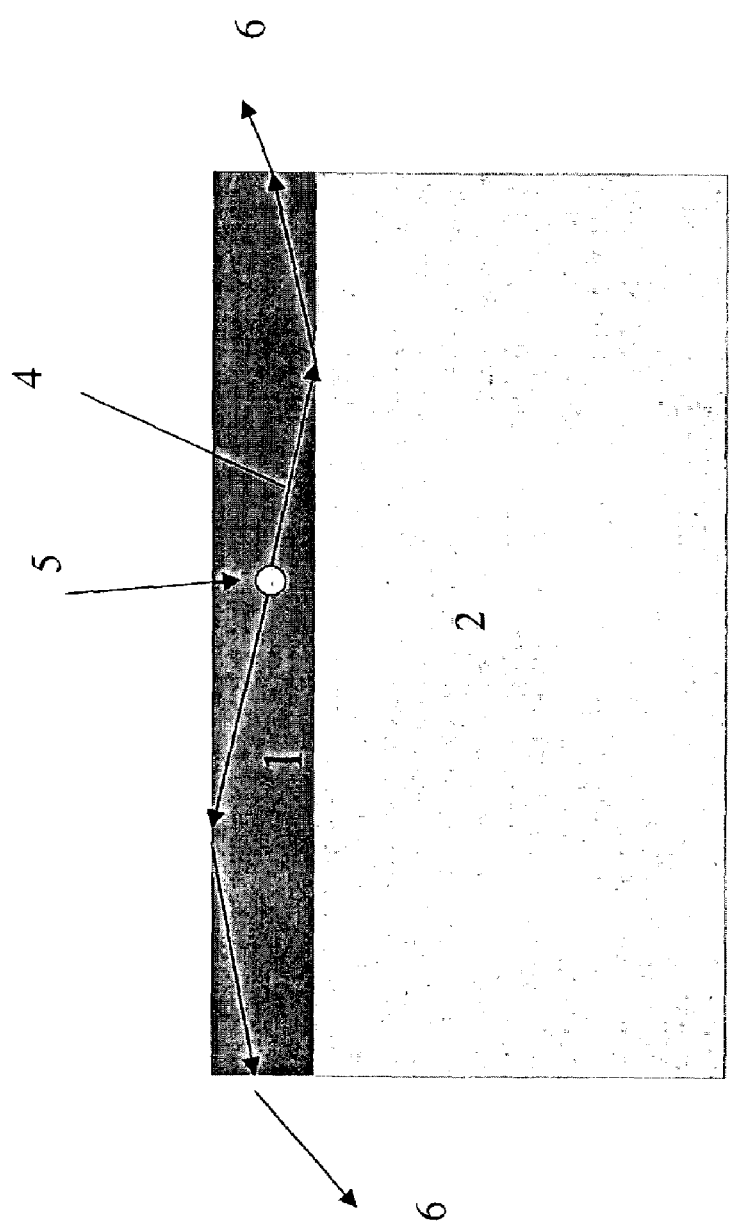
FIG. 2 also schematically shows an arbitrary point of light emission (5) from the LED active area (1). The active area (1) is typically a nitride material (e.g. GaN) and is deposited onto a substrate (2), which is typically sapphire or silicon carbide. The light rays (4), which emanate from the point of light emission in the active region are either coupled out of the top of the active region, coupled into the substrate material, or couple out of the sides of the active region.

The calculations are made by assuming an isotropic emission of light and determining the total solid angle for each of the emission possibilities. That is, the material properties determine the solid angle over which the light either couples out of the top of the active region, stays in the active region in a waveguide mode and gets emitted from the side of the active region, such as shown by light rays (6) in FIG. 2 or couples into the substrate (2).

Figure 3:
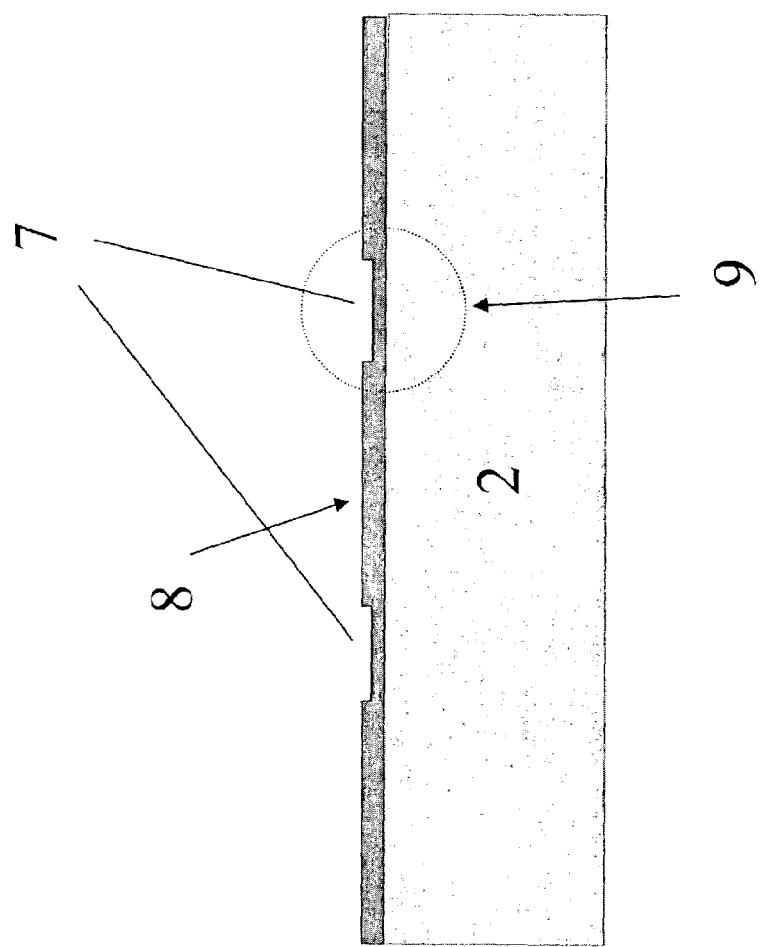

FIG. 3 shows a typical LED die before dicing. The wafer typically has a die region (8) that is rectangular (or square) and is approximately 200–300 $\mu$m (micrometers) across in each direction. The low regions (7) between the dies are called 'streets' and this is where the dies are diced. Most of the street regions remain clear and this is where, according to the present invention, the structures are preferably patterned for efficient light collection. The circled region (9) of FIG. 3 is the region that is the subject of most of the discussion and most of the figures shown. In the calculations, the substrate (2) is sapphire, but the present invention is not limited to such a sapphire substrate. The top regions are the GaN material, with the high (pedestal) regions being p-type GaN and the lower regions are n-type GaN. Hence, the pedestal is preferably etched down to approximately the p-n junction plane.

The present invention, in a particularly preferred embodiment, may comprise the following additional steps to current LED wafer processing:

1. Etching into the GaN region on the wafer until approximately 0.5–1.5 $\mu$m, preferably 0.75–1.25 $\mu$m, of GaN material remains.
2. Spin coating about 3–10 $\mu$m, preferably about 5–8 $\mu$m, of a spin-on glass material (SOG) onto the wafer.
3. Patterning the SOG with a vertically tapered mirror shape (for example, but not limited to, a simple 45° angle or parabolic lens shape).
4. Spin coating and patterning a photoresist over the high (unetched) GaN regions.
5. Evaporating metal over the mirror and streets only.
6. Removing the photoresist.
7. Spin coating another 5–10 $\mu$m SOG layer onto the wafer to planarize the surface of the device.
8. Optionally, patterning a microlens on top of the planarized surface.

Figure 4:
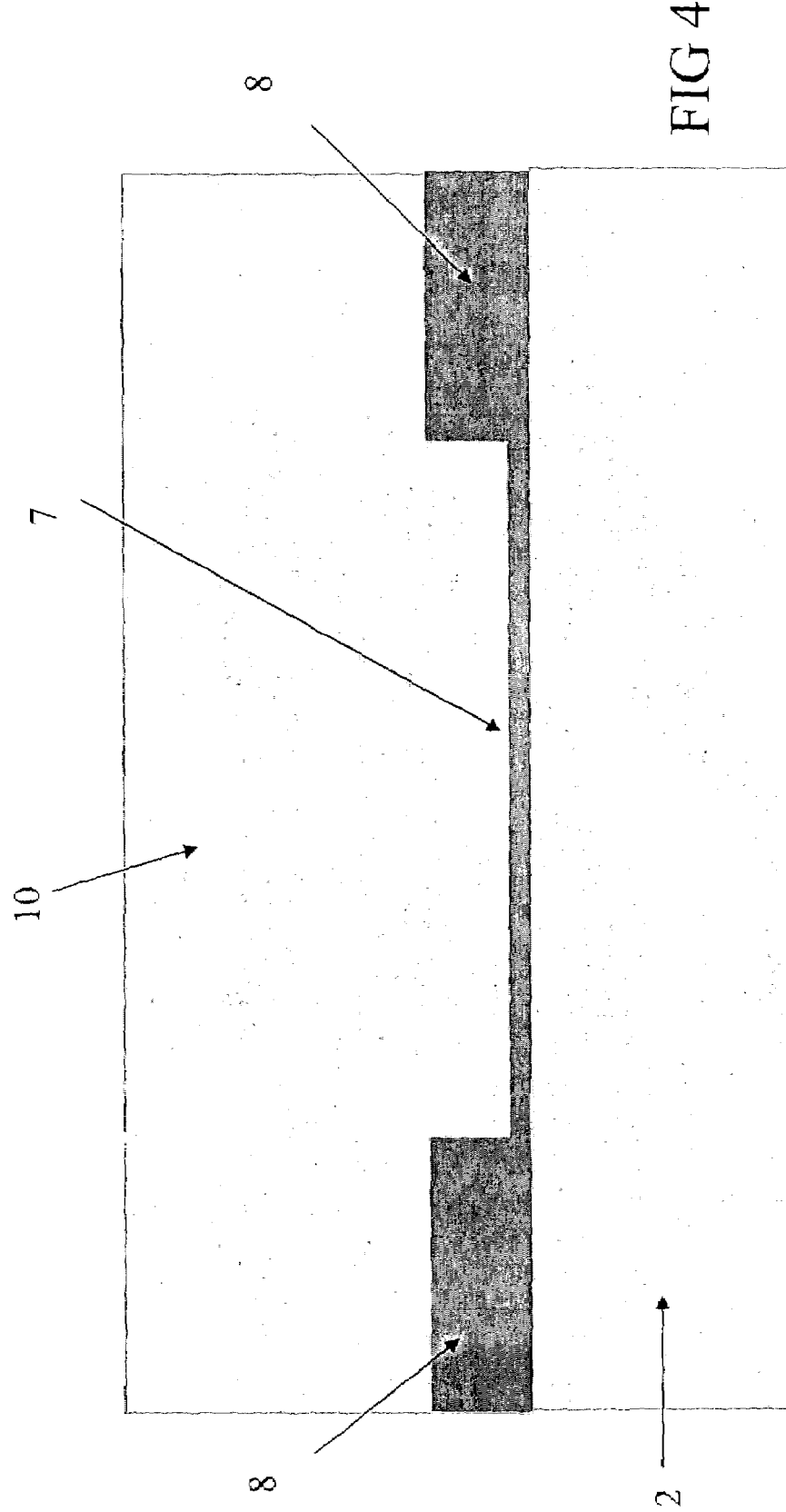

The GaN region is preferably etched down as close as possible to the sapphire substrate layer (2) in order for most of the light to exit from the side of the GaN region. The next step of the process is shown in FIG. 4 and comprises spin coating approximately 10 $\mu$m of SOG (10) onto the wafer. The etched active region (8) which is on top of the substrate (2) is then totally coated with the SOG material. The SOG coating (10) also covers the 'street' region (7), which has been etched back so that only about 1 $\mu$m of the active material remains in the 'streets'.

Figure 5:
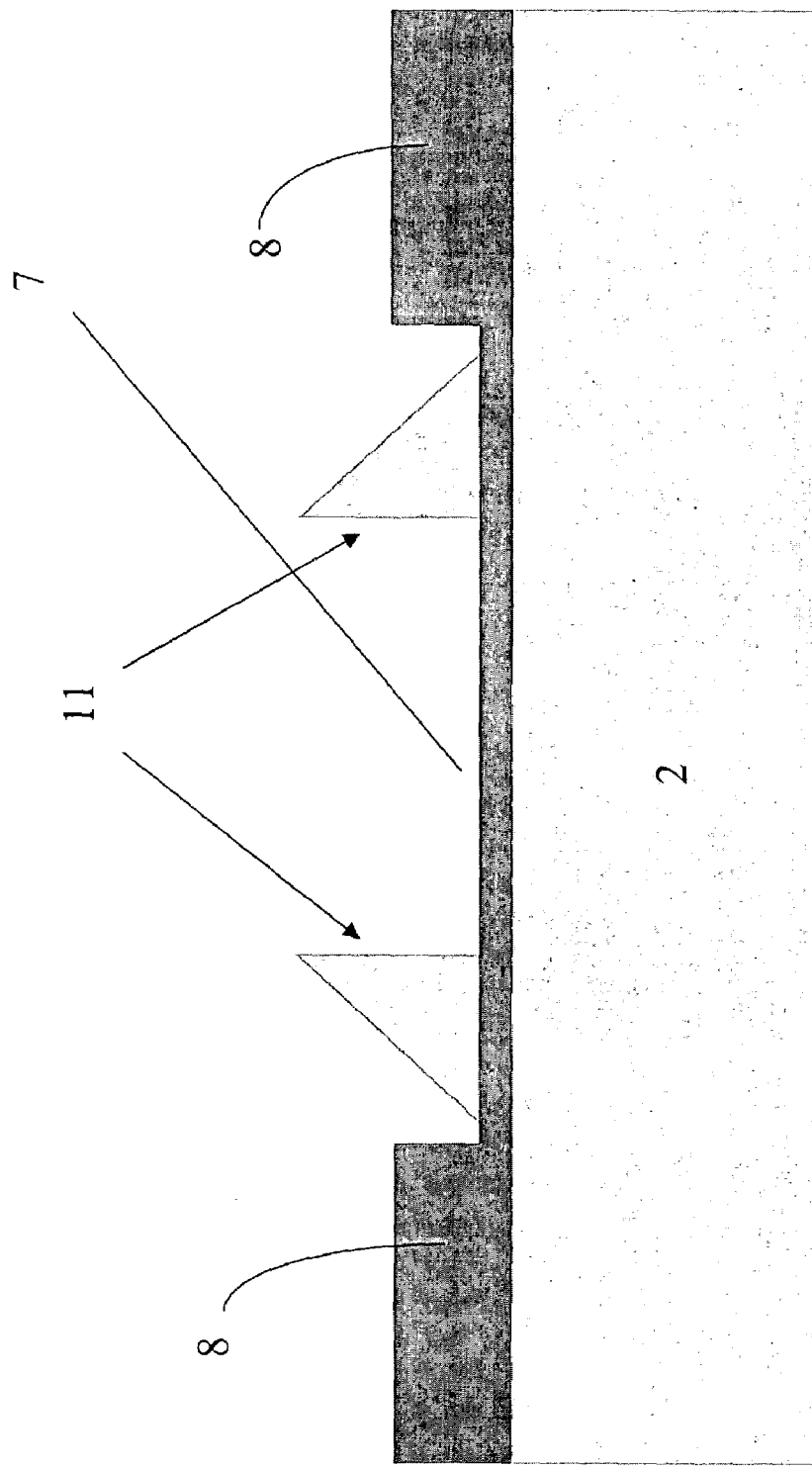

The next step, shown in FIG. 5, is to pattern the SOG to form the basis for flat mirrors or microstructures (11) or lens shaped mirrors. The shape of the mirror is determined by the quality and divergence of the light as it emerges from the sides of the LED die. This light behavior is determined by the index of refraction of the LED die, the substrate, the top coating(s) and the LED electrode patterns. The microstructures are formed in the streets (7) of the active region (8). The active region is, as usual, the region on top of the substrate (2).

Figure 6:
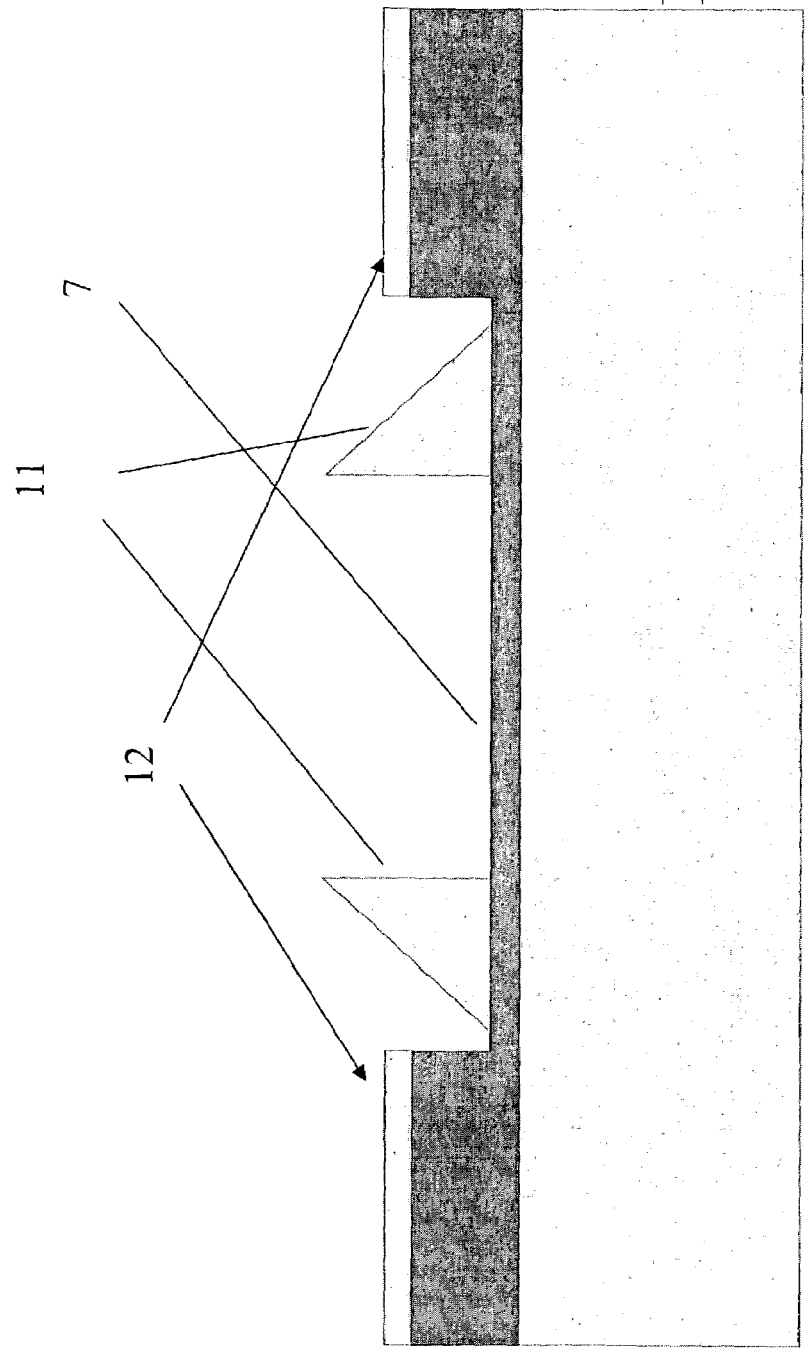
Figure 7:
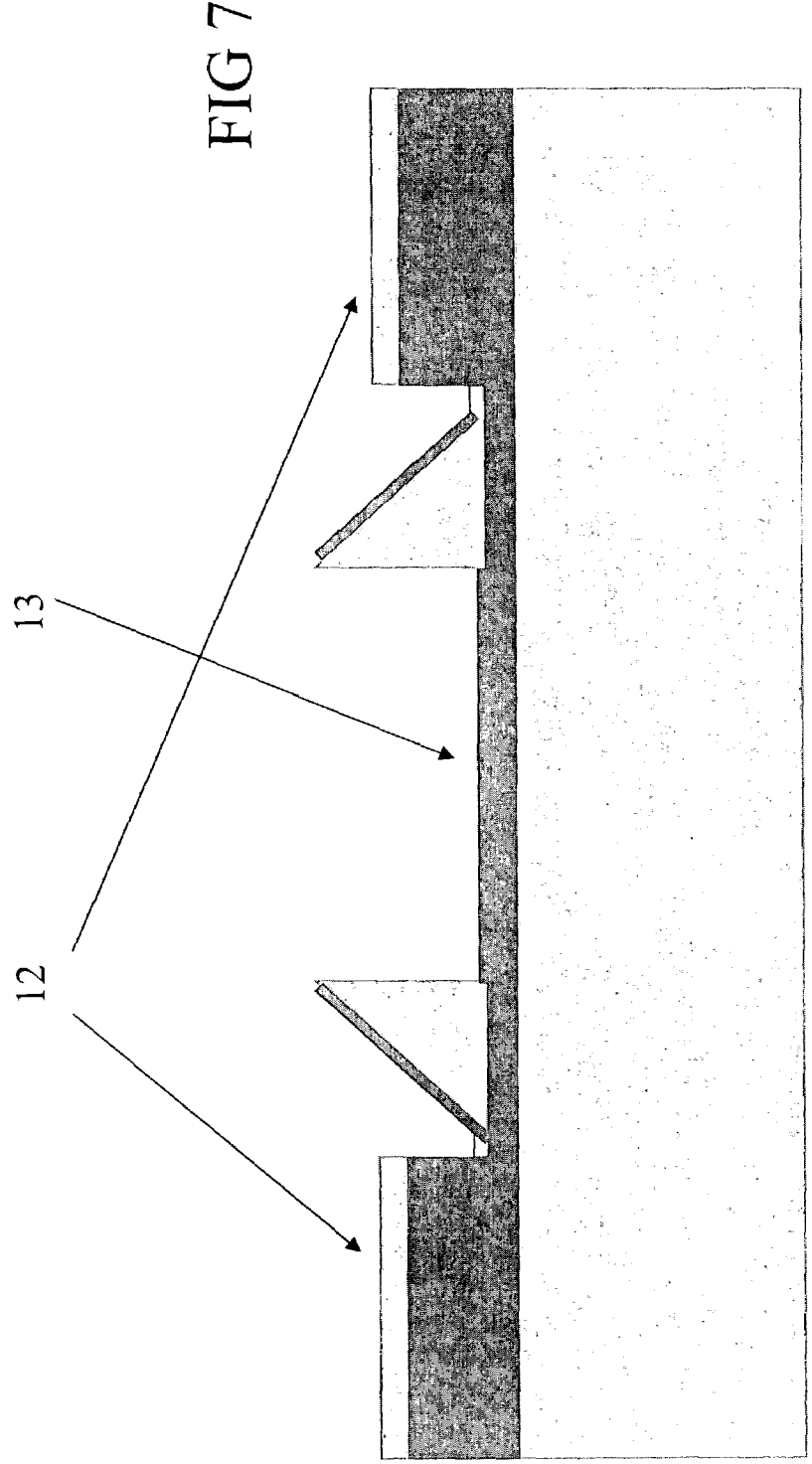

The reflective surface must then be prepared. These steps are shown in FIG. 6 and FIG. 7. The sample is first coated with a positive or negative acting photoresist (12) and then the photoresist is patterned to thereby expose only the region where metal (13), e.g. gold, aluminum, etc., will remain. The metal will eventually coat the street region 7 and the microstructures (11), which have previously been fabricated.

Figure 8:
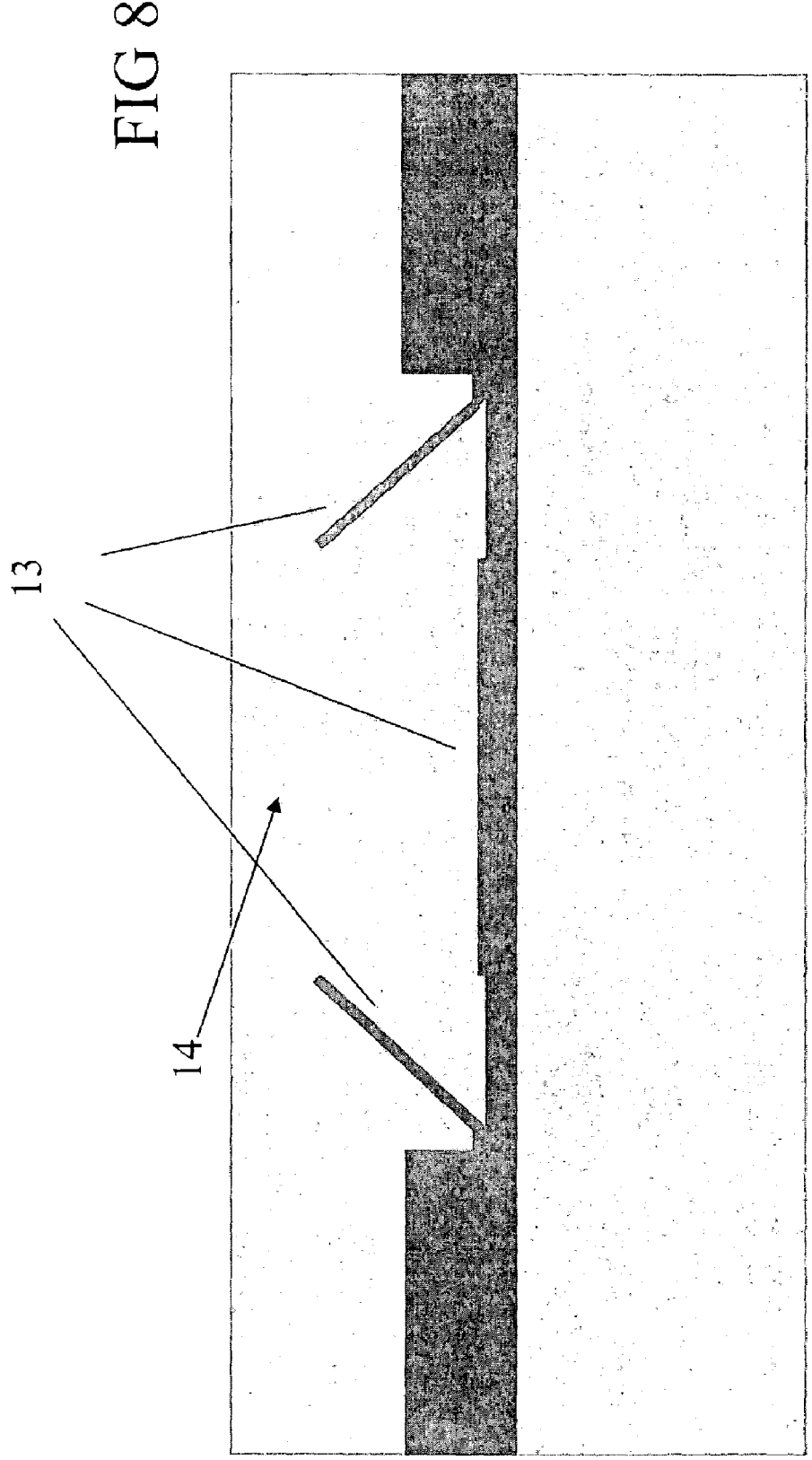
Figure 9:
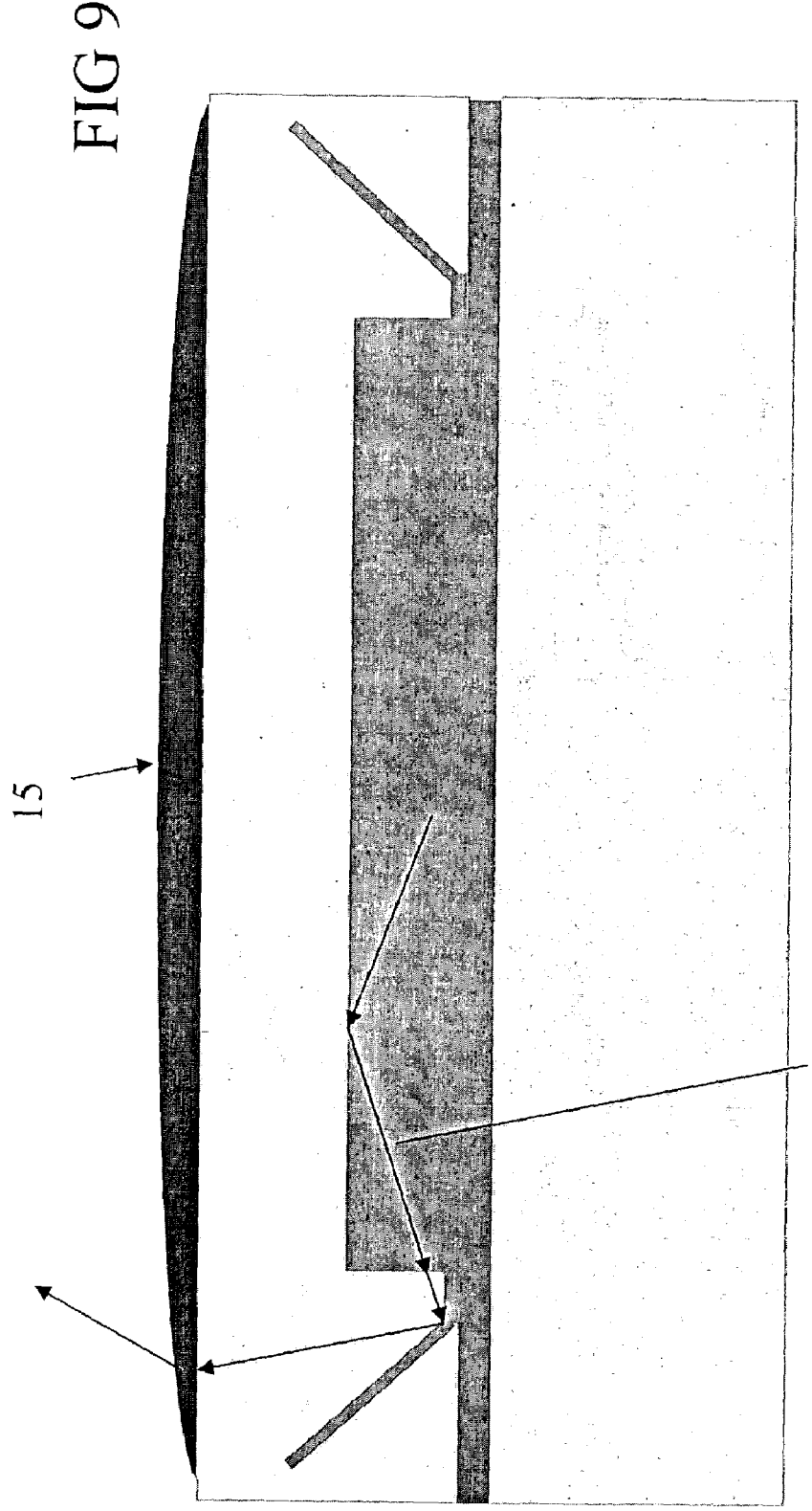

After depositing the metal for the mirror surface, the patterned photoresist must be removed, such as by developing with an aqueous alkaline developer, using a method well known to those skilled in the art. After removing this photoresist, the sample can be planarized with another SOG layer (14), but this is not required. In either case, the light is efficiently coupled out of the top of the structure by reflecting off of the mirror structures (13). This step is shown in FIG. 8. The advantage that the additional SOG coating provides is that it reduces the angular divergence of the side-coupled light because of the smaller change in index of refraction between the LED active region and the SOG versus the index of refraction change between the LED active region and air. In addition, since the change in index of refraction is smaller than it is with air, the range of angles over which the light will emit from the top surface of the active GaN region goes from 0°–25.8° to 0°–47°. This increases the amount of light extracted from the top by 5% to 12%, if the light can be efficiently extracted from the SOG layer. Finally, if the material is then planarized, additional structures can be patterned onto the top layer, such as microlenses (15) (diffractive or refractive), gratings, etc. as shown in FIG. 9. The light path (4) of side-coupled light is then coupled efficiently out of the top of the LED die structure, without the need for external light extraction mechanisms in the packaging.

Figure 10:
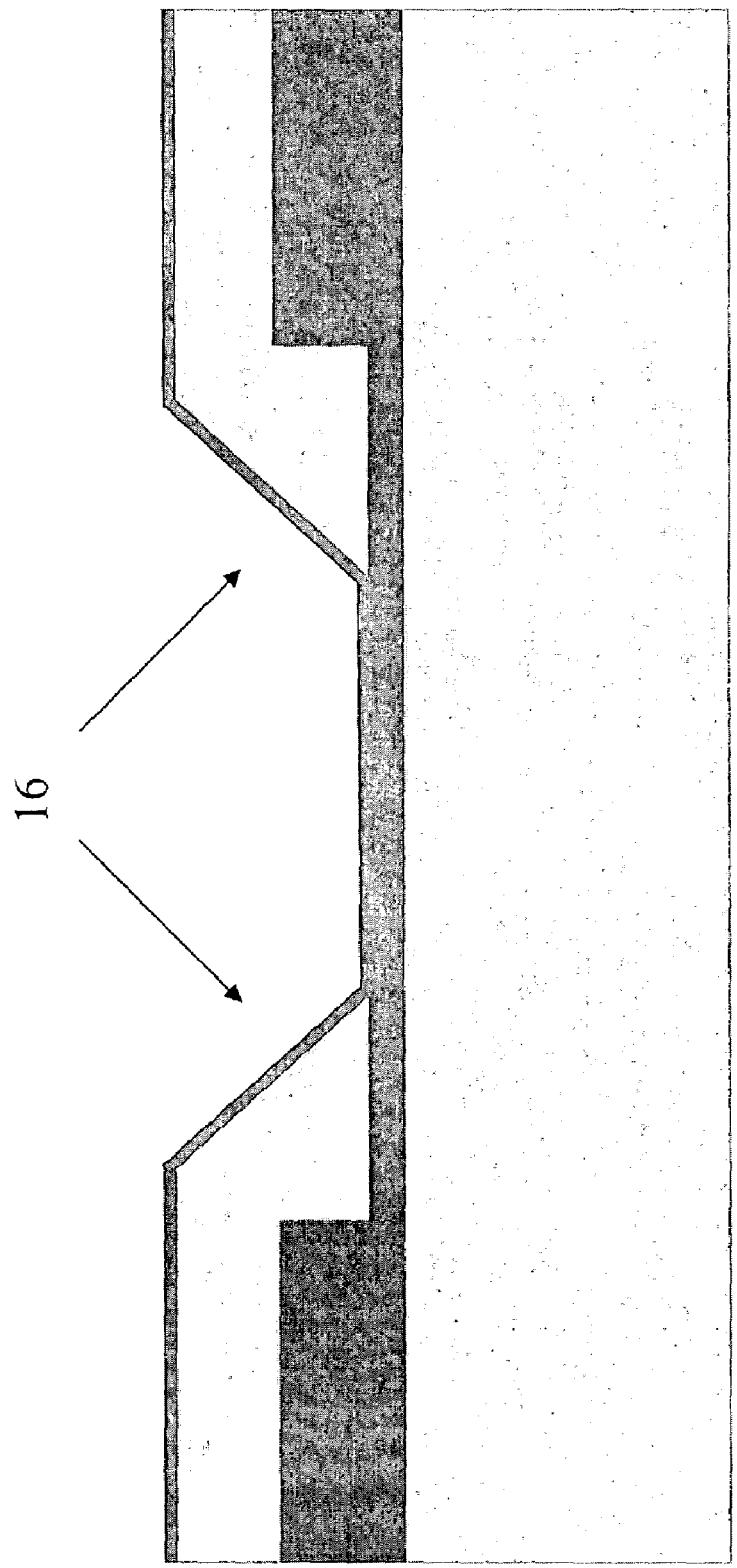
Figure 11:
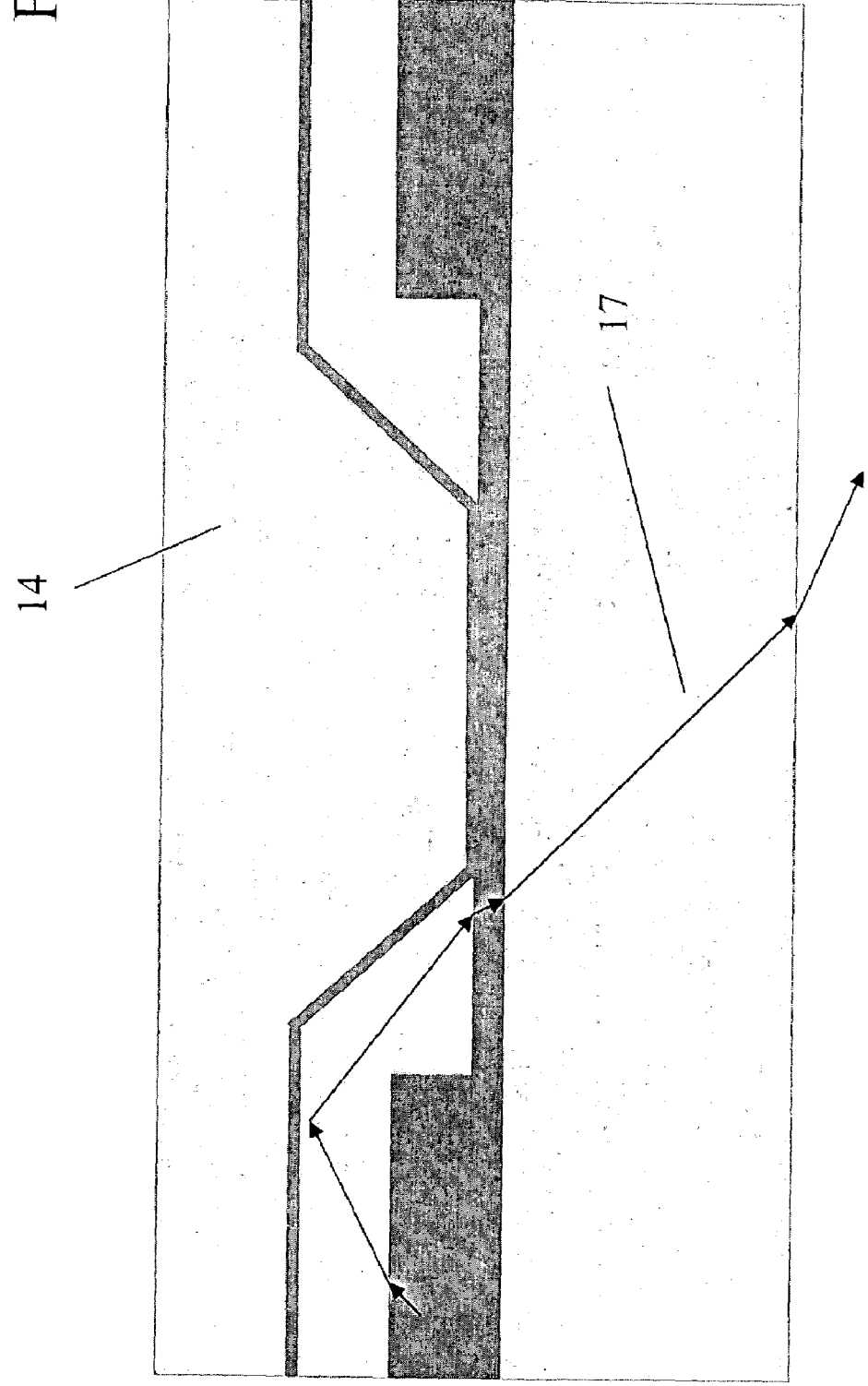

The subject invention also includes a method for providing a flip-chip, in which the LED chip is designed so that the light is emitted through the substrate (upside down geometry to the previous device). FIG. 10 shows a differently shaped patterned metallized microstructure (16) that enables light that is coupled out of the top and side of the LED active region to be efficiently reflected through the bottom of the chip (which is the top of the device in a flip-chip design). Again, the metalized microstructure can be coated with more SOG (14) to protect the structure. The exiting beam path (17) is shown in FIG. 11. This design is even more efficient at collecting the generated light from the LED die since the top, side, and bottom emitted light is extracted, whereas in the previous discussed design only the side and top guided light is extracted.

Figure 12:
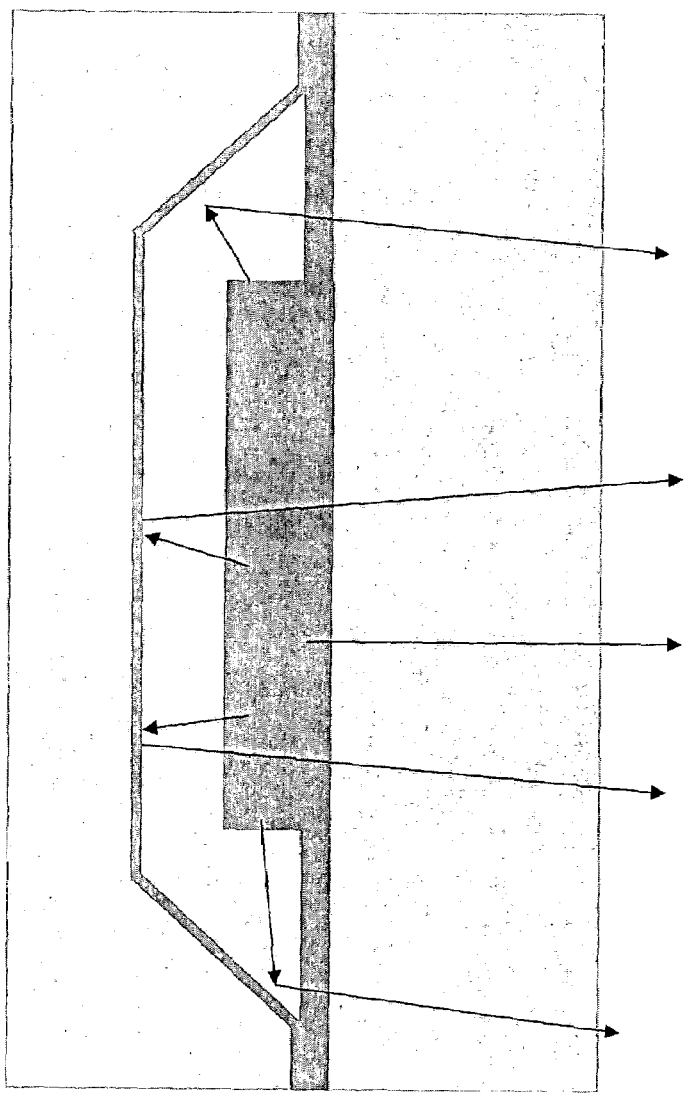

FIG. 12 shows a fully diced flip-chip design LED die with a designed SOG microstructure on top of the active GaN region, with the light (18) exiting the bottom at nearly 100% efficiency. Light that is otherwise lost out of the top of the die is collected using this design and process, which is incorporated into the die manufacturing process before dicing.

The present invention is applicable to a wide range of light emitting devices, such as LED's, fabricated from a wide range of materials (e.g., gallium nitride, organic LED's, etc.). The claimed invention may also be used with many substrates (e.g., SiC, sapphire, etc.) and is not limited to substrates that have a lower index of refraction than that of the light-emitting region. The invention additionally includes vertical emission or flip-chip designs, wherein the structures are fabricated using a wide range of SOG materials. For example, shaping the GaN region of the light-emitting region itself can also be fabricated.

Of note is the fact that the sloped reflective surface is flat for a few μm (micrometers) after the edge of the LED active region, because of ease of fabrication. The active region is normally only about 4 μm high, thus, it would be difficult to fabricate the sloped region immediately adjacent to the active region. Therefore, it is preferred to deposit metal on the base for a few micrometers before reaching the sloped surface.

For a white light-emitting LED, the present invention also includes the case where the SOG material, or another material used in the fabrication process, contains a white light generating dopant. For example, LED dies with a SOG as an encapsulant have been fabricated and tested (see Provisional Patent Application No. 60/387,453 filed on 11 Jun. 2002). The purpose of the encapsulant was to protect the LED device and, in some cases, to serve as a host for a phosphorescent material that emit white light upon UV, violet, or blue pump excitation. The embodiments of the present invention also may incorporate a white light-generating dopant into the host matrix SOG material.

What is claimed is:

1. A method of fabricating an optical microstructure on the top and/or bottom of a light-emitting device contained on a substrate, comprising providing a vertically tapered, 3-dimensionally-shaped microstructure of a spin-on-glass material on said light emitting device on said substrate by depositing said spin-on-glass material directly onto said light-emitting device on said substrate, wherein said spin-on-glass material is a hybrid glass/polymer sol-gel material capable of being processed at a temperature of less than 225 Degrees Centigrade, and thereby providing efficient collection of light that is coupled laterally out of said light emitting device.

2. The method of claim 1, comprising fabricating said tapered microstructure on the bottom of said substrate using a back-side alignment photolithography method.

3. A method of fabricating an optical microstructure on the top and/or bottom of a light-emitting device contained on a substrate, comprising providing a vertically tapered, 3-dimensionally-shaped microstructure of a spin-on-glass material on said light emitting device on said substrate by depositing said spin-on-glass material directly onto said light-emitting device on said substrate, and further comprising coating said tapered microstructure with metal thereby providing increased reflectivity that increases the light extracted from said light emitting device.

4. A method of fabricating an optical microstructure on the top and/or bottom of a light-emitting device contained on a substrate, comprising providing a vertically tapered, 3-dimensionally-shaped microstructure of a spin-on-glass material on said light emitting device on said substrate by depositing said spin-on-glass material directly onto said light-emitting device on said substrate, and further comprising shaping said tapered microstructures and thereby providing a lensing effect for efficient imaging or directing of the light.

5. A method of fabricating an optical microstructure on the top and/or bottom of a light-emitting device contained on a substrate, comprising providing a vertically tapered, 3-dimensionally-shaped microstructure of a spin-on-glass material on said light emitting device on said substrate by depositing said spin-on-glass material directly onto said light-emitting device on said substrate, further comprising depositing a spin-on glass material containing a phosphorescent material onto said substrate, thereby enabling the generation of white light or other colors.

6. The method of claim 1, wherein said substrate is a wafer.

7. The method of claim 1, wherein said light emitting device is a light-emitting diode, a vertical cavity surface emitting laser or a photo detector.

8. The method of claim 1, wherein said light emitting device is a light-emitting diode.

9. The method of claim 1, comprising depositing about 3–10 μm of said spin-on glass material onto a wafer.

10. The method of claim 1, further comprising depositing a metal on said vertically tapered, 3-dimensionally-shaped microstructure.

* * * * *